(12) United States Patent
Arlemark (10) Patent No.: US 10,336,612 B2
(45) Date of Patent: Jul. 2, 2019

(54) OZONE GENERATOR UNIT AND SYSTEM (71) Applicant: Ozone Inventions Limited, London (GB)

(72) Inventor: Jan Arlemark, Boliqeime (PT)

(73) Assignee: Xylem Europe GmbH, Schaffhausen (CH)

( * ) Notice: Subject to any disclaimer, the term of this patent is extended or adjusted under 35 U.S.C. 154(b) by 0 days.

(21) Appl. No.: 16/170,875

(22) Filed: Oct. 25, 2018

(65) Prior Publication Data

US 2019/0071310 A1 Mar. 7, 2019

Related U.S. Application Data

(63) Continuation of application No. PCT/IB2017/054595, filed on Jul. 28, 2017.

(30) Foreign Application Priority Data

Aug. 5, 2016 (SE) ...................................... 1630183

(51) Int. Cl.
*C01B 13/11* (2006.01)
*C02F 1/78* (2006.01)

(52) U.S. Cl.
CPC ............ *C01B 13/115* (2013.01); *C01B 13/11* (2013.01); *C01B 2201/12* (2013.01);
(Continued)

(58) Field of Classification Search
None
See application file for complete search history.

(56) References Cited

U.S. PATENT DOCUMENTS 5,525,310 A 6/1996 Decker et al.
5,529,760 A * 6/1996 Burris .................... B01J 19/088
422/186.07
(Continued)

FOREIGN PATENT DOCUMENTS

| EP | 1165435 B1 | 11/2005 |
| WO | 0053529 A1 | 9/2000 |
| WO | 0220398 A1 | 3/2002 |

OTHER PUBLICATIONS

International Search Report, Application No. PCT/IB2017/054595, dated Nov. 15, 2017, 4 pages.
(Continued)

*Primary Examiner* — Kishor Mayekar
(74) *Attorney, Agent, or Firm* — Ziegler IP Law Group, LLC (57) ABSTRACT

An ozone generator unit includes a housing with a first half having a first recess and a second half having a second recess. The ozone generator unit further includes an inlet and an outlet in the housing, a first dielectric disc arranged within the first recess in contact with an inner surface of the first half, a second dielectric disc arranged within the second recess in contact with an inner surface of the second half, and a high voltage electrode, having a gas passage, arranged between the first and second dielectric discs. The high voltage electrode is spaced apart from the first and second dielectric discs using a first spacer and a second spacer to constitute a first gas chamber and a second gas chamber on either side of the high voltage electrode.

20 Claims, 3 Drawing Sheets

(52) U.S. Cl.
CPC ...... *C01B 2201/22* (2013.01); *C01B 2201/32* (2013.01); *C01B 2201/34* (2013.01); *C01B 2201/40* (2013.01); *C01B 2201/72* (2013.01); *C01B 2201/76* (2013.01); *C01B 2201/90* (2013.01); *C02F 1/78* (2013.01); *C02F 2201/782* (2013.01)

(56) References Cited

U.S. PATENT DOCUMENTS

| | | | |
|---|---|---|---|
| 6,093,289 A * | 7/2000 | Kuzumoto | C01B 13/11 204/176 |
| 9,067,788 B1 * | 6/2015 | Spielman | C01B 13/10 |
| 2001/0046459 A1 | 11/2001 | St. Onge et al. | |
| 2003/0147787 A1 * | 8/2003 | Borgstrom | C01B 13/11 422/186.07 |
| 2007/0154365 A1 * | 7/2007 | Matsuno | C01B 13/11 422/186.07 |

OTHER PUBLICATIONS

Written Opinion of the International Searching, Application No. PCT/IB2017/054595, dated Nov. 15, 2017, 6 pages.

\* cited by examiner

OZONE GENERATOR UNIT AND SYSTEM

CROSS-REFERENCE TO RELATED APPLICATIONS

This application is a bypass continuation application of International Application No.PCT/IB2017/054595 filed on 28 Jul. 2017, which claims priority to Swedish Application No. SE 1630183-0 filed on 5 Aug. 2016, the disclosures of which are incorporated herein by reference in their entireties.

TECHNICAL FIELD

The present disclosure relates generally to generation of ozone; and more specifically, to an ozone generator unit and an ozone generator system.

BACKGROUND

Ozone may be used for various industrial and commercial applications like air purification, water treatment, odour removal, and so forth. Popularly, ozone may be produced using devices (such as an ozone generator) by utilizing principles such as corona discharge. Corona discharge is the production of an electrical discharge around an electrically charged conductor. In an ozone generator, the electrically charged conductor may be placed between two dielectrics to define two gas chambers on either side of the electrically charged conductor. A gas stream containing oxygen molecules is then passed through the ozone generator. Corona discharge ionizes some of the oxygen molecules in the gas stream. Thereafter, the ionized oxygen recombines with oxygen molecules in the gas stream to produce ozone.

For example, European patent EP1165435 B1, "Pressure compensation ozone generator and method for generation of ozone", discloses an apparatus and a method for ozone generator by exposing oxygen to a high frequency alternating current with high voltage over a dielectric. The apparatus includes a pressure compensation admitting unit, joint together by at least two plates of a dielectric material and there between a present electrode, on which a high frequency alternatively current with high voltage is applicable; and two sealed spaces for generation of ozone on opposite sides of said unit. The respective sealed space on the opposite side of said plate of dielectric material, is delimited by an earthed and cooled electrode, through which oxygen gas or gas rich in oxygen is supplied to the space and ozone is conducted out of the same.

However, such known ozone generators may be subject to pressure variations therein. For example, the gas stream may flow unevenly around the electrically charged conductor, thereby leading to an uneven (or non-uniform) gas distribution within the two gas chambers. Consequently, such gas distribution may lead to development of non-uniform pressures within the gas chambers. Therefore, the electrically charged conductor and/or the two dielectrics within the ozone generator may be subject to non-uniform stresses.

Moreover, production of ozone may generate heat within the ozone generator, and conventionally water cooling may be used to dissipate such heat. However, the use of water as a cooling medium may not be optimal due to presence of high voltage current with respect to such devices.

Therefore, in light of the foregoing discussion, there exists a need to overcome the aforementioned drawbacks associated with conventional ozone generators.

SUMMARY

The present disclosure seeks to provide an ozone generator unit. The present disclosure also seeks to provide an ozone generator system. The present disclosure seeks to provide a solution to the existing problems of pressure variations and cooling of ozone generators. An aim of the present disclosure is to provide a solution that overcomes at least partially the problems encountered in prior art, and provides a solution for uniform flow of the gas stream, and efficient cooling for ozone generators.

In one aspect, an embodiment of the present disclosure provides an ozone generator unit comprising:
  a housing comprising:
    a first half having a first recess; and
    a second half having a second recess, wherein the first half is coupled to the second half for allowing the first and second recesses to form a main chamber within the housing;
  an inlet and an outlet in the housing and extending to the main chamber;
  a first dielectric disc, arranged within the first recess in contact with an inner surface of the first half;
  a second dielectric disc, arranged within the second recess in contact with an inner surface of the second half, wherein at least the first dielectric disc has a gas passage; and
  a high voltage electrode, having a gas passage, arranged in the main chamber and between the first and second dielectric discs, wherein the high voltage electrode is spaced apart from the first and second dielectric discs using a first spacer and a second spacer to constitute a first gas chamber and a second gas chamber on either side of the high voltage electrode, and wherein the gas passage of the high voltage electrode and the gas passage of the first dielectric disc fluidically couple the first and second gas chambers.

In another aspect, an embodiment of the present disclosure provides an ozone generator system comprising:
  at least one ozone generator unit, the at least one ozone generator unit comprising:
    a housing comprising:
      a first half having a first recess; and
      a second half having a second recess, wherein the first half is coupled to the second half for allowing the first and second recesses to form a main chamber within the housing;
    an inlet and an outlet in the housing and extending to the main chamber;
    a first dielectric disc, arranged within the first recess in contact with an inner surface of the first half;
    a second dielectric disc, arranged within the second recess in contact with an inner surface of the second half, wherein at least the first dielectric disc has a gas passage; and
    a high voltage electrode, having a gas passage, arranged in the main chamber and between the first and second dielectric discs, wherein the high voltage electrode is spaced apart from the first and second dielectric discs using a first spacer and a second spacer to constitute a first gas chamber and a second gas chamber on either side of the high voltage electrode, and
    wherein the gas passage of the high voltage electrode and the gas passage of the first dielectric disc fluidically couple the first and second gas chambers;

a first bracket attached to the inlet of each of the at least one ozone generator units;

a second bracket attached to the outlet of each of the at least one ozone generator units;

at least one control circuit associated with each of the at least one ozone generator units; and at least one fan arranged in front of an outer surface of each of the at least one ozone generator units.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides an ozone generator unit comprising:

a housing comprising:

a first half having a first recess; and a second half having a second recess, wherein the first half is coupled to the second half for allowing the first and second recesses to form a main chamber within the housing;

an inlet and an outlet in the housing and extending to the main chamber;

a first dielectric disc, arranged within the first recess in contact with an inner surface of the first half;

a second dielectric disc, arranged within the second recess in contact with an inner surface of the second half, wherein at least the first dielectric disc has a gas passage; and a high voltage electrode, having a gas passage, arranged in the main chamber and between the first and second dielectric discs, wherein the high voltage electrode is spaced apart from the first and second dielectric discs using a first spacer and a second spacer to constitute a first gas chamber and a second gas chamber on either side of the high voltage electrode, and wherein the gas passage of the high voltage electrode and the gas passage of the first dielectric disc fluidically couple the first and second gas chambers.

In another aspect, an embodiment of the present disclosure provides an ozone generator system comprising:

at least one ozone generator unit, the at least one ozone generator unit comprising:

a housing comprising:

a first half having a first recess; and a second half having a second recess, wherein the first half is coupled to the second half for allowing the first and second recesses to form a main chamber within the housing;

an inlet and an outlet in the housing and extending to the main chamber;

a first dielectric disc, arranged within the first recess in contact with an inner surface of the first half;

a second dielectric disc, arranged within the second recess in contact with an inner surface of the second half, wherein at least the first dielectric disc has a gas passage; and a high voltage electrode, having a gas passage, arranged in the main chamber and between the first and second dielectric discs, wherein the high voltage electrode is spaced apart from the first and second dielectric discs using a first spacer and a second spacer to constitute a first gas chamber and a second gas chamber on either side of the high voltage electrode, and wherein the gas passage of the high voltage electrode and the gas passage of the first dielectric disc fluidically couple the first and second gas chambers;

a first bracket attached to the inlet of each of the at least one ozone generator units;

a second bracket attached to the outlet of each of the at least one ozone generator units;

at least one control circuit associated with each of the at least one ozone generator units; and at least one fan arranged in front of an outer surface of each of the at least one ozone generator units.

The present disclosure thus provides an ozone generator unit and an ozone generator system. The ozone generator unit provides a uniform gas flow and distribution around a high voltage electrode, thereby leading to uniform gas pressures in gas chambers on either side of the high voltage electrode. Further, the ozone generator unit and system provide efficient cooling for heat generated during ozone generation. Specifically, an arrangement of dielectric discs within first and second halves of housing, coating of metal layer on the dielectric discs and the presence of plurality of cooling fins provide the efficient cooling. Further, heat may be dissipated efficiently by air cooling, subsequently, increasing energy efficiency of the ozone generator unit and system. Optionally, heat may be dissipated by techniques such as passive cooling, water cooling, and so forth.

In an embodiment, the term "ozone generator unit" used herein refers to a device which may be used for generation of ozone (or trioxygen). Specifically, the ozone generator unit generates ozone by subjecting a gas stream to a corona discharge (or a high voltage electric field). In an embodiment, the gas stream includes a gas comprising oxygen, for example, air or diatomic oxygen gas. The corona discharge may ionise oxygen molecules in the gas stream. Thereafter, the ionised molecules in the gas stream may recombine to form ozone. It may be evident that the ozone generator unit may be made of a material suitable to withstand generation of ozone.

The ozone generator unit comprises a housing. Specifically, the housing may be an outer cover or casing of the ozone generator unit. The housing comprises a first half having a first recess, and a second half having a second recess. In an embodiment, the first half and the second half of the ozone generator unit, constitute a first ground electrode and a second ground electrode respectively. Specifically, the first and second ground electrodes may be used for cooling of the ozone generator unit by a suitable cooling medium, such as air.

In an embodiment, the housing may be assembled by attaching the first half with the second half using screws at a plurality of positions on the first and second halves. It may be evident that shape, size and arrangement of the first and second halves are such that leakage of the gas stream and/or ozone from the housing may be avoided. In an embodiment, the housing is operable to be subjected to air cooling.

According to an embodiment, the first half includes a cylindrical first recess. Specifically, the cylindrical first recess may be a cavity in the first half to accommodate components of the ozone generator unit therein. Similarly, the second half includes a cylindrical second recess (or cavity). In an embodiment, the first and second recesses may be configured to have one of a geometrical shape, other than cylindrical shape, such as cubical, cuboidal, hemispherical and any combination thereof. Further, it will be appreciated that the geometrical shape of the first and second recesses may be configured in a manner that allows suitable accommodation of the components of the ozone generator unit therein.

The first half is coupled to the second half for allowing the first and second recesses to form a main chamber within the housing. The term "main chamber" used herein refers to a contiguous arrangement of the first and second recesses. Specifically, the main chamber is a hollow space within the housing, adapted to accommodate a plurality of components therein.

In one embodiment, the first half and the second half may be of a shape including, but not limited to, a cuboid or a cylinder. For example, the ozone generator unit may include a flat cuboid shape. Specifically, the housing, may include the flat cuboid shape, having first and second cuboid halves of same dimensions. In an embodiment, the first and the second halves may be made of aluminium, stainless steel or other similar metals. It may be evident that the material of the first and the second halves should not react with ozone, thereby avoiding contamination of ozone, and increasing longevity of use of the ozone generator unit.

In an embodiment, at least a portion of an outer surface of the first and the second halves comprises a plurality of cooling fins. Specifically, the plurality of cooling fins may be ridges (or flanges or raised edges) on the outer surface of the first and/or the second halves. It may be evident that presence of the plurality of cooling fins may increase surface area of the outer surface of the first and the second halves. Therefore, an increased outer surface area may be exposed to air (cooling medium) for dissipation of heat in order to reduce time required to cool the ozone generator unit. In an example, the plurality of cooling fins may have triangular cross sections. In another example, the plurality of cooling fins may have polygonal cross section, such as rectangular cross section.

The ozone generator unit further comprises a first dielectric disc, arranged within the first recess to contact an inner surface of the first half. Further, the first dielectric disc has a gas passage. Specifically, the gas passage may be a hole (or a passage) on the first dielectric disc to allow movement of the gas stream within the main chamber. Further, the gas passage may be present centrally or may be eccentric. It may be evident that more than one gas passage may be present on the first dielectric disc. The contact of the first dielectric disc with the inner surface of the first half leads to a reduction in energy required to cool the ozone generator unit. Specifically, heat generated within the main chamber during ozone generation may be transmitted via the first dielectric disc to the first half (or first ground electrode) by conduction. Thereafter, an air stream around the outer surface of the first half may be used as the cooling medium to cool the ozone generator unit. This approach of cooling may be energy efficient when compared to conventional water cooling approach. Similarly, the ozone generator unit comprises a second dielectric disc, arranged within the second recess to contact an inner surface of the second half. Therefore, the contact of the second dielectric disc with the inner surface of the second half leads to a reduction in energy required to cool the ozone generator unit. At least the first dielectric disc has a gas passage.

In one embodiment, the first and second dielectric discs, each include a gas passage to allow movement of the gas stream within the main chamber (explained herein later in greater detail). In an embodiment, the first and second dielectric discs are made of a dielectric material, such as aluminate ($AlO_2$), quartz glass and so forth. Further, the first and second dielectric discs are of same shape and size. For example, the first and second dielectric discs may be circular in shape and have same diameter. In another example, the first and second dielectric discs may be polygonal in shape, and have same dimensions.

In an embodiment, the first and second dielectric discs are coated with a layer of metal on a surface, of the first and second dielectric discs, in contact with the first and the second halves. In an example, a layer of gold (Au) or silver (Ag) may be coated on the surfaces of the first and second dielectric discs which may be in contact with the first and the second halves. The metal coating increases cooling efficiency of the ozone generator unit by forming a metallic contact of the first and second dielectric discs with the first and the second halves. Specifically, the metallic contact increases conduction of heat from the first and second dielectric discs to the first and the second halves. In an example, a silver coating on surfaces of the first and second dielectric discs may increase the ozone output of the ozone generator unit by 10 percent as compared to the ozone output without the silver coating on surfaces of the first and second dielectric discs. In another example, a gold coating on surfaces of the first and second dielectric discs may provide a higher cooling efficiency as compared to a silver coating, due to higher conduction of heat.

The ozone generator unit further comprises a high voltage electrode, having a gas passage, arranged in the main chamber, and between the first and second dielectric discs. Specifically, the high voltage electrode may be a metallic conductor capable of withstanding a high voltage current for the generation of ozone. In an example, the high voltage current (or high frequency alternating current) may be applied to the high voltage electrode via a high voltage connection extending from a power supply to the ozone generator unit. Specifically, a high voltage cable may extend through a wall entrance (such as a cavity or a recess) into the housing and coupled to the high voltage electrode at one end and at other end coupled to a high voltage current source.

The gas passage of the high voltage electrode and the gas passage of the first dielectric disc fluidically couple the first and second gas chambers. Specifically, gas passages of the high voltage electrode and first dielectric disc allow movement of the gas stream and/or ozone within the main chamber. In an example, the gas passages of the high voltage electrode and the first dielectric disc are holes in centres thereof. In such example, the central hole of the high voltage electrode aligns coaxially with the central hole of the first dielectric disc for fluidically coupling the first and second gas chambers.

In an embodiment, the high voltage electrode may be made of stainless steel or tungsten. Further, a peripheral edge of the high voltage electrode may comprise a plurality of grooves. The plurality of grooves may be arranged symmetrically or asymmetrically on the peripheral edge of the high voltage electrode.

The high voltage electrode is spaced apart from the first and second dielectric discs using a first spacer and a second spacer to constitute a first gas chamber and a second gas chamber on either side of the high voltage electrode.

In an embodiment, the first spacer and the second spacer are elements configured to mount two components apart by a specific distance. Specifically, the first spacer may be used to space apart the high voltage electrode from the first dielectric disc by a specific distance. Similarly, the second spacer may be used to space apart the high voltage electrode from the second dielectric disc by a specific distance.

In an embodiment, the distance of the high voltage electrode from the first and second dielectric discs lies within a range of 0.05 millimeters and 0.2 millimeters. It may be evident that the aforementioned range of distance between the high voltage electrode and the first and second dielectric discs may be optimum, but not necessary for operation of the ozone generator unit. For example, the distance of the high voltage electrode from the first and second dielectric discs is 0.08 millimeters. In such embodiments, generation and quantity (or yield) of ozone from the ozone generator unit, may be optimal.

In an embodiment, the spacer has a star-like form (i.e. five branches). In alternative embodiments, the spacer may have any other form (i.e. four or six branches) suitable for spacing apart the high voltage electrode from the first and second dielectric discs.

In an embodiment, the first and second gas chambers may be spaces, between the high voltage electrode and the first and second dielectric discs (spaced apart using spacers). Specifically, the first gas chamber may be defined as a space between the first dielectric disc and the high voltage electrode. Similarly, the second gas chamber may be defined as a space between the second dielectric disc and the high voltage electrode.

It may be evident that the plurality of grooves on the peripheral edge, and the gas passage of the high voltage electrode allow flow of the gas stream within the first and second gas chambers of the main chamber. Moreover, the flow of gas stream may be uniform due to the plurality of grooves on the peripheral edge of the high voltage electrode. Therefore, pressure within the first and second gas chambers may be similar (or uniform).

In an embodiment, the ozone generator unit has a modular, flat-type configuration which may be easily assembled. Specifically, the ozone generator unit may be assembled in a sandwich-like configuration (or a layered configuration) by an arrangement of the high voltage electrode, the first and second spacers, and the first and second dielectric discs.

In an embodiment, the ozone generator unit further comprises an insulating ring arranged between the inner surfaces of the first and the second halves, and periphery of the high voltage electrode and the first and second dielectric discs. Specifically, the insulating ring is made of an insulating material, such as teflon, to resist a flow of current due to the corona discharge. In one embodiment, an inner diameter of the insulating ring may correspond to diameters of the high voltage electrode and the first and second dielectric discs, for secure assembly of the ozone generator unit. Further, it may be obvious that there may be a clearance between the periphery (of the high voltage electrode and the first and second dielectric discs) and the insulating ring to allow flow of the gas stream into the main chamber (particularly, into the first and second gas chambers).

In an embodiment, the ozone generator unit also comprises at least one sealing ring arranged between the insulating ring and the inner surfaces of the first and the second halves. The at least one sealing ring may be arranged to seal the gas chambers and/or the main chamber to prevent leakage of gas stream and/or ozone from the ozone generator unit. In an example, the at least one sealing ring may be O-rings.

The ozone generator unit comprises an inlet and an outlet in the housing and extending to the main chamber. In an embodiment, the inlet and the outlet may be arranged radially or axially on the housing. For example, one of the inlet and the outlet may be arranged radially and the other one may be arranged axially. Alternatively, the inlet and the outlet may be arranged centrally or peripherally on the housing. For example, the inlet and the outlet are arranged radially in the housing and axially in the centre area of the housing, respectively, and extending to the main chamber. In another example, the inlet and the outlet are arranged axially in the centre area of the housing and radially in the housing, respectively, and extending to the main chamber. Specifically, an inlet may be a central point of entry (of inflow) of the gas stream into the housing, and the outlet may be a peripheral point of exit (or outflow) of ozone from the housing. In an embodiment, the ozone generator unit may include more than one inlet to permit uniform flow of gas stream between the first and second gas chambers. In an embodiment, the inlet and the outlet may be made of a material same as the first and second halves of the housing, such as aluminium. Otherwise, the inlet and the outlet may be made of other suitable material, such as an ozone resistant plastic.

In operation, the ozone generator unit may be used for generation of ozone by subjecting the gas stream to the corona discharge. Specifically, ionisation of the gas stream for generation of ozone generates heat within the ozone generator unit. It may be evident that cooling of the ozone generator unit is critical for proper functionality thereof. Specifically, the housing is operable to be subjected to air cooling. In an embodiment, the aforementioned arrangement of the high voltage electrode, the first and second spacers, and the first and second dielectric discs provides a solution for cooling of the ozone generator unit. Specifically, the first and second dielectric discs contact the inner surfaces of the first and second halves and transmit the generated heat thereto (by conduction). Therefore, air around outer surfaces of the first and second halves may be used as the cooling medium to cool the ozone generator unit. The aforementioned cooling may be enhanced by coating a layer of metal on the surfaces of the first and second dielectric discs in contact with the first and the second halves. Further, cooling may also be enhanced by the plurality of cooling fins on the outer surface of the first and/or the second halves.

In an embodiment, the application of the high voltage current to the high voltage electrode may initiate a sputtering process. Specifically, iron particles (or ions) from the high voltage electrode may react with oxygen in the main chamber and subsequently get deposited on the first and second dielectric discs. Therefore, the first and second dielectric discs may include a layer of iron oxide thereon. The deposition of iron oxide layer increases the ozone output of the ozone generator unit.

Another aspect of the present disclosure provides an ozone generator system having at least one ozone generator unit (as explained hereinabove). The ozone generator system may be used for generating a greater quantity of ozone as compared to an ozone generator unit. In one embodiment, the at least one ozone generator unit may be connected in parallel to define the ozone generator system.

The ozone generator system comprises a first bracket attached to the inlet of each of the at least one ozone generator units. Specifically, the first bracket may be an elongated structure having a channel or being configured to receive a tube (or a pipe) therein. The channel/tube may be attached to the inlet of each of the at least one ozone generator units to provide a uniform inflow of the gas stream into the ozone generator units. Further, the first bracket may act as a rigid support for parallel arrangement and connection of the ozone generator units.

The ozone generator system further comprises a second bracket attached to the outlet of each of the at least one ozone generator units. Similarly, the second bracket may be an elongated structure having a channel, configured to receive a tube (or a pipe) therein. The tube may be attached to the outlet of each of the at least one ozone generator units to enable a uniform outflow of the ozone from the ozone generator units. Further, the first bracket may act as a rigid support for parallel arrangement and connection of the ozone generator units.

The ozone generator system also comprises at least one control circuit associated with each of the at least one ozone generator units. Specifically, the at least one control circuit may include components (such as electrical, mechanical and computing units) to control operation of the at least one ozone generator units. It may be evident, that the components of the control circuits may be capable of withstanding high voltage current. In an embodiment, the at least one control circuit may be mounted on at least one circuit board.

The ozone generator system further comprises at least one fan arranged in front of an outer surface of each of the at least one ozone generator units. The at least one fan may be used for cooling the at least one ozone generator units by directing air over the outer surfaces thereof. In an embodiment, the at least one fan may be arranged in front of outer surfaces (of the ozone generator units) including the plurality of cooling fins.

DETAILED DESCRIPTION OF THE DRAWINGS

Figure 1:
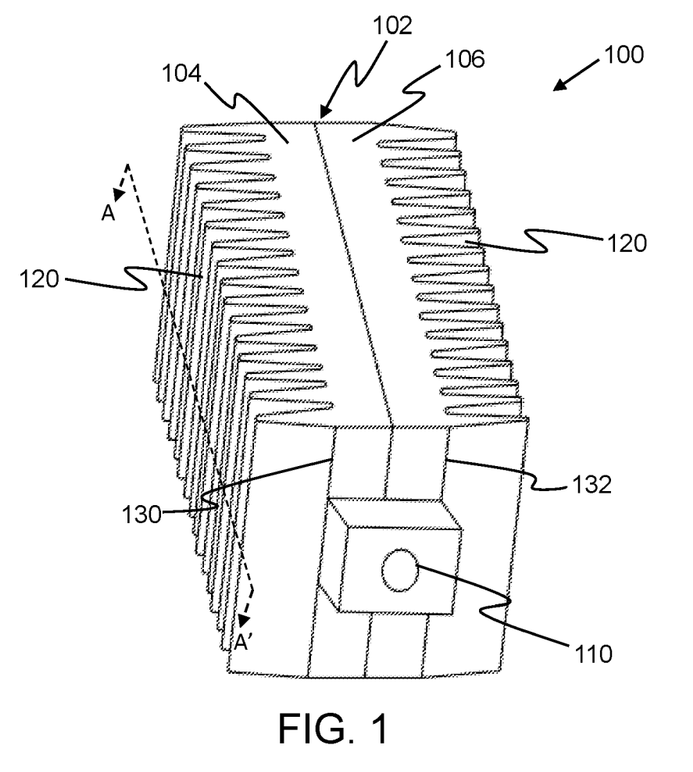
FIG. 1 illustrates a perspective view of an ozone generator unit, in accordance with an embodiment of the present disclosure.

FIG. 1 illustrates a perspective view of an ozone generator unit 100, in accordance with an embodiment of the present disclosure. Specifically, the ozone generator unit 100 includes a housing 102 having a first half 104 and a second half 106. Also, the ozone generator unit 100 includes an inlet (not shown) and an outlet 110. Further, the ozone generator unit 100 may include components like dielectric discs (not shown), a high voltage electrode (not shown), and spacers (not shown) accommodated in the housing 102. The ozone generator unit 100 includes a plurality of cooling fins 120 extending from at least a portion of an outer surface of the first and the second halves 104, 106. Specifically, the plurality of cooling fins 120 extend from the side walls 130, 132 of the first half 104 and the second half 106, respectively.

Figure 2:
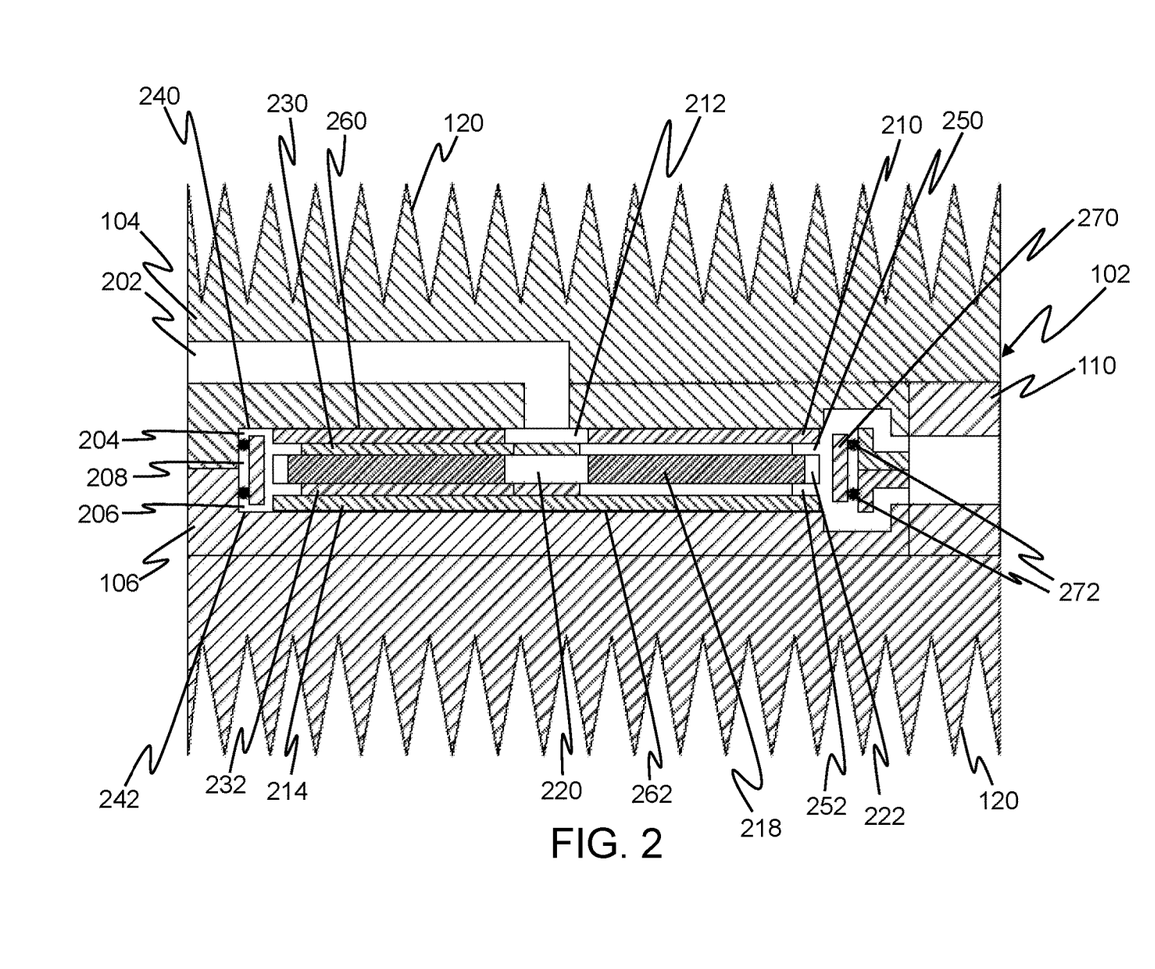
FIG. 2 illustrates a sectional view of the ozone generator unit of FIG. 1 along an axis A-A', in accordance with an embodiment of the present disclosure.

FIG. 2 illustrates a sectional view of the ozone generator unit 100 of FIG. 1 along an axis A-A', in accordance with an embodiment of the present disclosure. As shown, the first half 104 is positioned on the second half 106, therefore a first recess 204 and a second recess 206 together form a main chamber 208 within the housing 102. The ozone generator unit 100 includes the plurality of cooling fins 120 (also shown in FIG. 1) extending from at least a portion of an outer surface of the first and the second halves 104, 106. Further, the outlet 110 is shown arranged radially in the housing 102, and an inlet 202 is arranged radially into the housing and axially into the main chamber at a centre area on the first half 104 of the housing 102. A first dielectric disc 210 is arranged in the first recess 204 in contact with an inner surface 240 of the first half 104. Similarly, a second dielectric disc 214 is arranged in the second recess 206 in contact with an inner surface 242 of the second half 106. Furthermore, a high voltage electrode 218 is arranged between the first dielectric disc 210 and the second dielectric disc 214; particularly, the high voltage electrode 218 is spaced apart from the first dielectric disc 210 and the second dielectric disc 214, respectively, using a first spacer 230 and a second spacer 232. This constitutes a first gas chamber 250 and a second gas chamber 252 on either side of the high voltage electrode 218.

A gas passage 220 of the high voltage electrode 218 aligns coaxially with gas passage 212 of the first dielectric disc 210 for fluidically coupling the first and second gas chambers 250, 252. As shown, a peripheral edge of the high voltage electrode 218 includes a plurality of grooves 222 to allow a uniform flow of a gas stream between the first and second gas chambers 250, 252. The first and second dielectric discs 210, 214 are coated with layers of metal 260, 262 and allowed to contact the inner surfaces 240, 242, respectively, of the first and the second halves 104, 106. The ozone generator unit 100 includes an insulating ring 270 arranged between the inner surfaces 240, 242 of the first and the second halves 104, 106, and periphery of the high voltage electrode 218 and the first and second dielectric discs 210, 214. The ozone generator unit 100 also includes sealing rings 272 arranged between the insulating ring 270 and the inner surfaces 240, 242 of the first and the second halves 104, 106.

Figure 3:
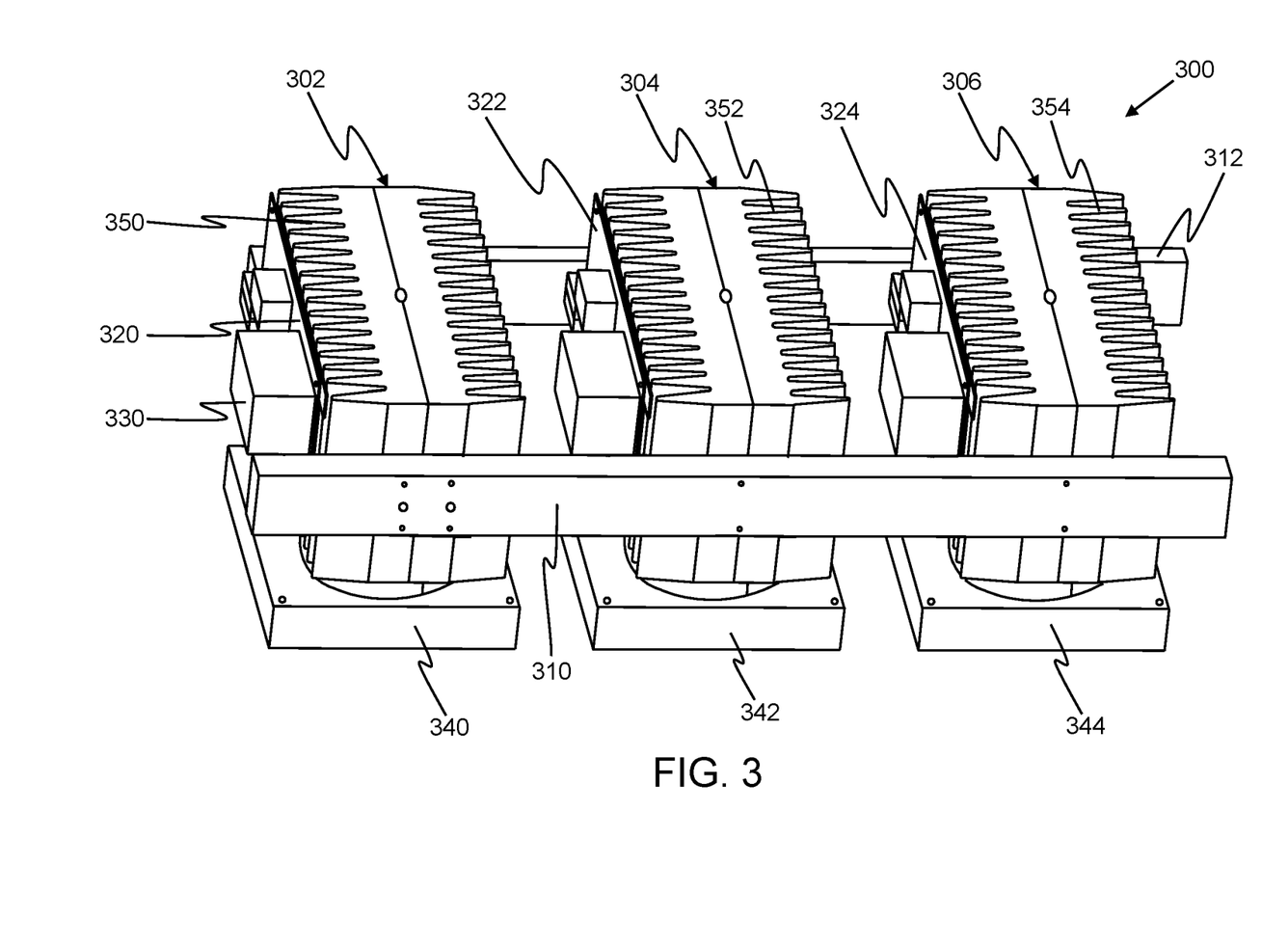
FIG. 3 illustrates a perspective view of an ozone generator system, in accordance with an embodiment of the present disclosure.

FIG. 3 illustrates a perspective view of an ozone generator system 300, in accordance with an embodiment of the present disclosure. The ozone generator system 300 includes a plurality of ozone generator units (such as, the ozone generator unit 100, shown in FIG. 1). As shown, the ozone generator system 300 includes three ozone generator units 302, 304 and 306. The ozone generator system 300 includes a first bracket 310 attached to inlets (not shown) of each of the ozone generator units 302, 304, 306. The ozone generator system 300 further includes a second bracket 312 attached to the outlets (not shown) of each of the ozone generator units 302, 304, 306. The ozone generator system 300 also includes at least one control circuit, such as circuits 320, 322, 324, associated with each of the ozone generator units 302, 304, 306, respectively. Each of the circuits 320, 322, 324 includes electronic components, such as 330, mounted thereon. Additionally, the ozone generator system 300 includes at least one fan, such as fans 340, 342 and 344, arranged in front of an outer surface of each of the at least one ozone generator units 302, 304, 306. Specifically, the fans 340, 342, 344 are directed towards the cooling fins 350, 352, 354 of the ozone generator units 302, 304, 306, respectively.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present.

The invention claimed is:

1. An ozone generator unit comprising:
   a housing comprising:
      a first half having a first recess; and
      a second half having a second recess, wherein:
   the first half is coupled to the second half, and
   the first recess and the second recess form a main chamber within the housing; and
   an inlet and an outlet in the housing and extending to the main chamber; wherein
   a first dielectric disc is arranged within the first recess in contact with an inner surface of the first half of the housing;
   a second dielectric disc is arranged within the second recess in contact with an inner surface of the second half of the housing, wherein the first dielectric disc has a gas passage; and
   a high voltage electrode having a gas passage fluidically coupled with the gas passage of the first dielectric is arranged in the main chamber between the first dielectric disc and the second dielectric disc, wherein a first spacer spaces the high voltage electrode apart from the first dielectric disc to form a first gas chamber between the high voltage electrode and the first dielectric disc and a second spacer spaces the high voltage electrode apart from the second dielectric disc to form a second gas chamber between the high voltage electrode and the second dielectric disc, and
   wherein the gas passage of the high voltage electrode and the gas passage of the first dielectric disc fluidically couple the first gas chamber and the second gas chamber.

2. An ozone generator unit according to claim 1, wherein the housing is configured to be subjected to air cooling.

3. An ozone generator unit according to claim 1, wherein at least a portion of an outer surface of the first half of the housing and the second half of the housing comprises a plurality of cooling fins.

4. An ozone generator unit according to claim 1, further comprising an insulating ring arranged between the inner surface of the first half of the housing and the inner surface of the second half of the housing, the insulating ring disposed at a peripheral end of the high voltage electrode, the first dielectric disc and the second dielectric disc.

5. An ozone generator unit according to claim 4, further comprising at least one sealing ring arranged between the insulating ring and the inner surface of the first half and the inner surface of the second half.

6. An ozone generator unit according to claim 1, wherein a peripheral edge of the high voltage electrode comprises a plurality of grooves.

7. An ozone generator unit according to claim 1, wherein the first half of the housing and the second half of the housing are made of aluminum.

8. An ozone generator unit according to claim 1, wherein the first dielectric disc and the second dielectric disc are made of one of aluminate or quartz glass.

9. An ozone generator unit according to claim 1, wherein the first dielectric disc and the second dielectric disc are coated with a layer of metal on a surface of the first dielectric disc and the second dielectric disc in contact with the first half and the second half of the housing.

10. An ozone generator unit according to claim 1, wherein a distance of the high voltage electrode from the first dielectric disc and the second dielectric disc lies within a range of 0.05 millimeters and 0.2 millimeters.

11. An ozone generator unit according to claim 1, wherein a geometric shape of the first recess and the second recess is one or more of a cylindrical shape, a cubical shape, a cuboidal shape or a hemispherical shape.

12. An ozone generator unit according to claim 1, wherein the inlet and the outlet are arranged radially or axially on the housing.

13. An ozone generator unit according to claim 12, wherein the inlet and the outlet are arranged centrally or peripherally on the housing.

14. An ozone generator unit according to claim 12, wherein the inlet is arranged axially in a center area of the housing and the outlet is arranged radially in the housing.

15. The ozone generator unit according to claim 1 wherein the first gas passage is constrained by an inner surface of the first dielectric, the high voltage electrode and insulating ring at ends of the high voltage electrode and the second gas passage is constrained by an inner surface of the second dielectric, the high voltage electrode and the insulating rings.

16. The ozone generator unit according to claim 1 wherein the main chamber is defined by the inner surface of first dielectric, the inner surface of the second dielectric, an inner surface of the first spacer and the inner surface of the second spacer.

17. The ozone generator unit according to claim 1, further comprising a plurality of grooves defined on an outer surface of the high voltage electrode.

18. The ozone generator unit according to claim 1, wherein the first gas chamber and the second gas chamber extends between a first end and a second end of the high voltage electrode.

19. An ozone generator system comprising:
   at least one ozone generator unit, the at least one ozone generator unit comprising:
      a housing comprising:
         a first half having a first recess; and
         a second half having a second recess, wherein the first half is coupled to the second half, and the first recess and the second recess form a main chamber within the housing; and
      an inlet and an outlet in the housing and extending to the main chamber; wherein
      a first dielectric disc is arranged within the first recess, the first dielectric disc extending along and being in contact with an entirety of an inner surface of the first half of the housing;
      a second dielectric disc is arranged within the second recess, the second dielectric disc extending along and being in contact with an entirety of an inner surface of the second half of the housing, wherein the first dielectric disc has a gas passage;

a high voltage electrode having a gas passage is fluidically coupled with the gas passage of the first dielectric and is arranged in the main chamber between the first dielectric disc and the second dielectric disc, a first spacer is positioned to space the high voltage electrode apart from the first dielectric disc to form a first gas chamber between the high voltage electrode and the first dielectric disc, the first gas chamber extending along a length between a first end of the high voltage electrode and a second end of the high voltage electrode; and a second spacer is positioned to space the high voltage electrode apart from the second dielectric disc to form a second gas chamber between the high voltage electrode and the second dielectric disc, the second gas chamber extending along a length between the first end and the second end of the high voltage electrode, and wherein the gas passage of the high voltage electrode and the gas passage of the first dielectric disc fluidically couple the first gas chamber and the second gas chamber;

a first bracket attached to the inlet of each of the at least one ozone generator units;

a second bracket attached to the outlet of each of the at least one ozone generator units;

at least one control circuit associated with each of the at least one ozone generator units; and at least one fan arranged in front of an outer surface of each of the at least one ozone generator units.

20. An ozone generator system according to claim 19, wherein the outer surface of each of the at least one ozone generator units comprises a plurality of cooling fins.

* * * * *